(12) United States Patent
Stansberry, Jr.

(10) Patent No.: US 8,093,501 B2
(45) Date of Patent: Jan. 10, 2012

(54) UNIVERSAL VARIABLE TRANSMISSION LINE HANGER

(76) Inventor: David L. Stansberry, Jr., La Vergne, TN (US)

( * ) Notice: Subject to any disclaimer, the term of this patent is extended or adjusted under 35 U.S.C. 154(b) by 102 days.

(21) Appl. No.: 12/483,104

(22) Filed: Jun. 11, 2009

(65) Prior Publication Data

US 2010/0000763 A1 Jan. 7, 2010

Related U.S. Application Data

(60) Provisional application No. 61/060,733, filed on Jun. 11, 2008.

(51) Int. Cl.
*H02G 7/12* (2006.01)
(52) U.S. Cl. ........ 174/146; 174/168; 174/148; 248/68.1
(58) Field of Classification Search .................. 174/146, 174/168, 169, 148, 138 E; 248/68.1, 74.4, 248/74.1
See application file for complete search history.

(56) References Cited

U.S. PATENT DOCUMENTS

| 2,631,804 | A | * | 3/1953 | Uhlhorn | 248/218.2 |
| 3,268,655 | A | * | 8/1966 | Haigh et al. | 174/146 |
| 5,794,897 | A | * | 8/1998 | Jobin et al. | 248/74.4 |
| 6,923,407 | B2 | * | 8/2005 | Takeuchi | 248/73 |
| 7,267,307 | B2 | * | 9/2007 | Bauer | 248/65 |
| 7,484,698 | B2 | * | 2/2009 | Budagher | 248/68.1 |

* cited by examiner

*Primary Examiner* — Dhirubhai R Patel
(74) *Attorney, Agent, or Firm* — Wayne Edward Ramage; Baker Donelson

(57) ABSTRACT

A universal cable hanger or clamp that can accommodate a variety of cable sizes, and can be mounted on a variety of structures in a various ways. The hanger includes a fixed block with a movable block, where the fixed block can be clamped or attached to a fixed structure, and includes a pair of partially open curved sections adapted to receive and hold cables of various sizes. The movable block includes two curved or V-shaped or U-shaped arms that correspond to the partially open curved sections. As the movable block is inserted into the fixed block, the arms close off the curved space, in whole or in part, to grip and hold a cable in the space. Two posts on the movable block engage indentations in slots on the fixed block, thereby providing a curved space of fixed size corresponding to different cable sizes. Multiple hangers can be stacked.

19 Claims, 25 Drawing Sheets

1-5/8"

1-1/4"

UNIVERSAL VARIABLE TRANSMISSION LINE HANGER

This application claims priority to Provisional Patent Application No. 61/060,733, filed Jun. 11, 2008, entitled "UNIVERSAL VARIABLE TRANSMISSION LINE HANGER," and is entitled to that filing date for priority. The complete disclosure, specification, drawings and attachments of Provisional Patent Application No. 61/060,733 are incorporated herein in their entireties by reference for all purposes.

FIELD OF INVENTION

This invention relates to an apparatus and system for affixing communications cables to a tower or structural element. More particularly, this invention relates to universal, stackable hangers for supporting one or more transmissions lines, conduits or cables of various sizes

BACKGROUND OF INVENTION

Hangers are devices used to support transmission lines, conduits and cables of a variety of types. Such hangers are used by the telecommunications, construction, and other industries when the line or cable must be secured or supported. For example, hangers are used to support coaxial cables along most, if not all, of their length by attachment to a support structure, such as a cellular telecommunications tower.

Lines and cables of this sort often are smooth, but with slight variations in diameter. Even with standardization, such lines and cables come in a variety of sizes. In the current art, hangers for each cable size are needed. This leads to inefficiency in installation and maintenance, as a number of hangers appropriate to various cable sizes must be stored and carried with technicians during various operations. This problem is exacerbated due to variety in the types of structural member to which the hangers are attached, resulting in a number of different means of attachment.

The growth in the telecommunications industry also has lead to the need to support an increasing number of lines and cables on the same structure. Stackable hangers are known in the prior art, which allow multiple cables to be attached in a stacked or piggy-back fashion. However, known stackable hanger systems tend to increase the wind profile of the system, increasing stress and the likelihood of structural failure.

Accordingly, what is needed is a hanger that can be adjusted in the field to hold and secure cables and lines of different sizes, can be attached to a structural member in a variety of ways, is easily installed, and can be stacked in a structurally sound manner.

SUMMARY OF INVENTION

In several exemplary embodiments, the present invention comprises a universal cable hanger or clamp that can accommodate a variety of cable sizes, and can be mounted on a variety of structures in a various ways. In one embodiment, the hanger comprises a fixed block with a movable block. The fixed block can be clamped or attached to a fixed structure, such as a section of a tower, and comprises a pair of partially open curved sections adapted to receive and hold cables of various sizes. The movable block comprises two curved or V-shaped or U-shaped arms that correspond to the partially open curved sections. As the movable block is inserted into the fixed block, the arms close off the curved space, in whole or in part, to grip and hold a cable in the space.

The movable block further comprises two opposing posts extending out from each side of the movable block. The posts are adapted to fit within the corresponding slots in the side of the fixed block. Each slot has a plurality of pairs of indentations. The posts each have a pair of protrusions that engage with an indentation pair so as to fix the movable block at a certain point, thus providing a curved space of a fixed size.

The movable block further comprises a thumb grip on one or both arms. The thumb grips are designed to enable a technician to more easily move the movable block down into the proper position to grip the cables to be held. Similarly, the posts may be capped by a larger diameter post end to enable a technician to more easily push the posts inward, thereby disengaging the movable block from the fixed block and allowing the movable block to be moved outward and cables to be removed. One or more support ribs may be used.

In another embodiment, the hanger further comprises a cap that fits over the movable block and is affixed (removably or permanently) to the top of fixed block. The cap prevents the movable block from being lost or becoming completely detached from the fixed block, which can cause problems when a technician is suspended on the side of a tower.

The fixed block may be fastened to the structural element in a variety of ways, so as to be able to be used with a variety of tower designs and materials. Holes and slots in the fixed block can be used with hose clamps or banding strips. A center hole allows the present invention to be used with a threaded rod. Alternatively, a plunger may engage corresponding slots in the bottom of the block.

Grooves or ridges may be used on all or a portion of the gripping surface of the fixed block and/or movable block. In one embodiment, the grooves or ridges on the movable block are fashioned in a diagonal or helical pattern, or some pattern incorporating grooves or ridges at an angle. Such grooves or ridges may be used on other gripping surfaces as well.

In several embodiments, the hanger can be stacked vertically. The means for stacking can vary depending on the attachment means. A plunger can be used with each hanger, with the plunger being inserted into a matching hole in the cap of the adjoining hanger. Alternatively, a threaded rod of suitable length can be used, extended through the corresponding holes in the center of the components of each hanger placed on the rod. A plug may be used to close off the center hole in the cap of the outermost hanger (or a single hanger, if only one is used). The plug may also serve as a reducer, with the center hole of the plug adapted to take other sized rods and clamps. Due to the length of the base of the movable block and the cap and other design elements, the stacked hanger structure is more secure and structurally sound than hanger stacks known in the prior art, resulting in less twisting and warping of the hanger structures when installed.

In one exemplary embodiment, the cable aperture is designed for ease of insertion of the cable during installation, and its curved design helps keep the cable in place when inserted. The thumb grips assist in pushing the movable block to engage the cable(s) after insertion so as to secure the cable(s). With the plunger, the hanger can be self-inserting.

DETAILED DESCRIPTION OF EXEMPLARY EMBODIMENTS

Figure 1:
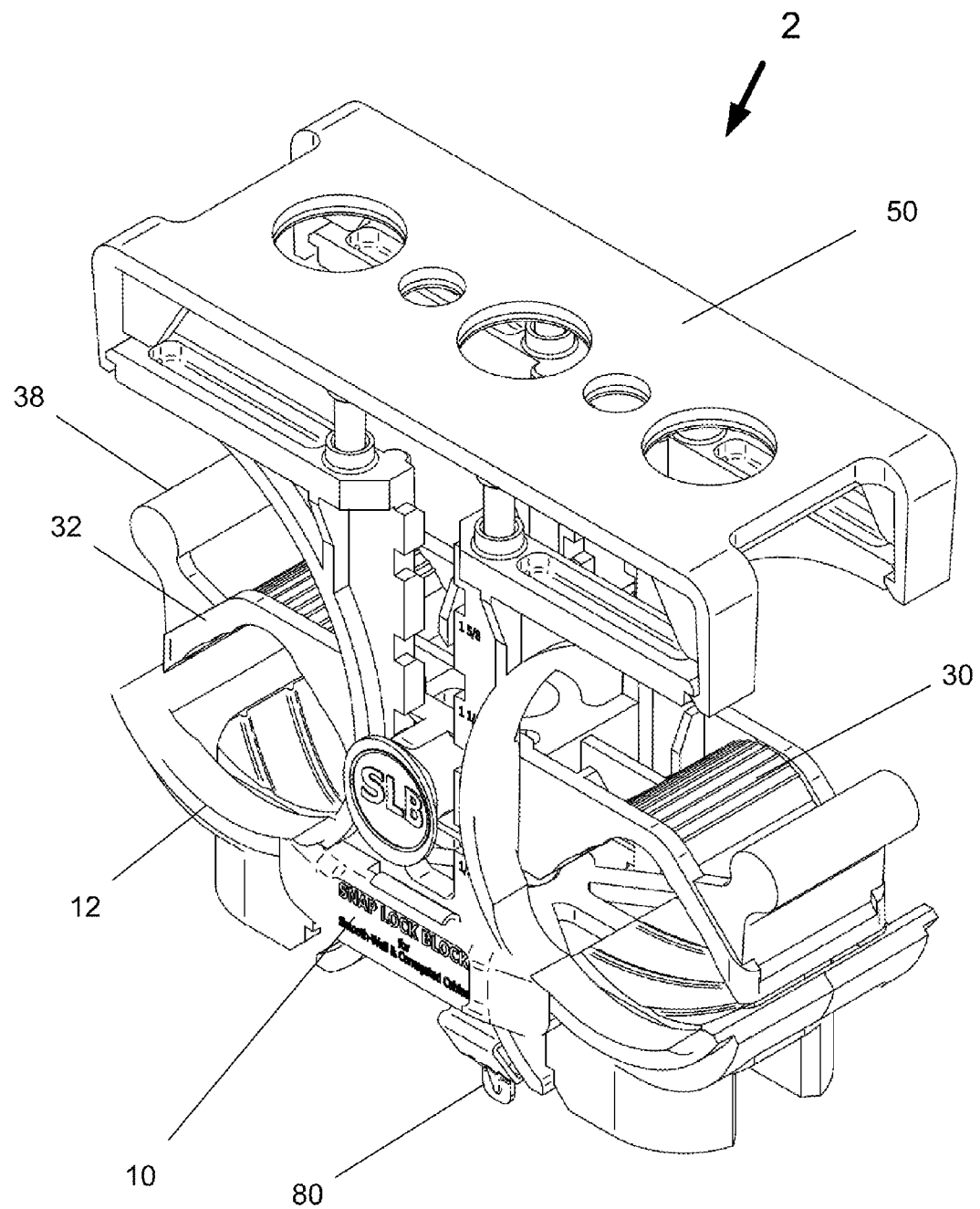
FIG. 1 is a perspective view of a hanger in accordance with an exemplary embodiment of the present invention.
Figure 2:
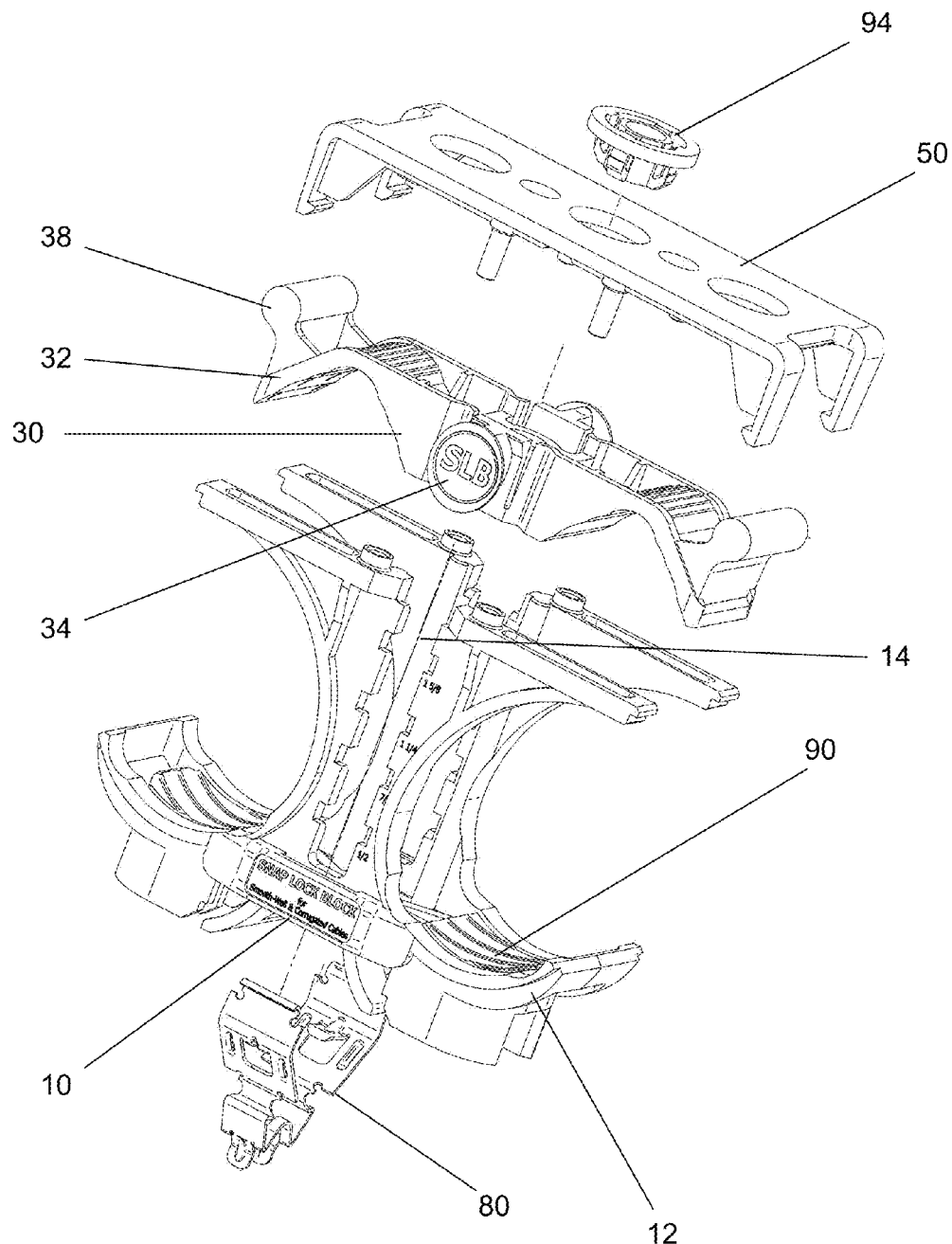
FIG. 2 is an exploded perspective view of the hanger of FIG. 1.

As seen in FIGS. 1 and 2, the present invention comprises a universal cable hanger or clamp 2 that can accommodate a variety of cable sizes, and can be mounted on a variety of structures in a various ways. One exemplary embodiment of the present invention comprises a fixed block 10 with a movable block 30. The fixed block 10 can be clamped or attached to a fixed structure, such as a section of a tower, and comprises a pair of partially open curved sections 12 adapted to receive and hold cables of various sizes. The movable block 30 comprises two curved or V-shaped or U-shaped arms 32 that correspond to the partially open curved sections 12. As the movable block 30 is inserted into the fixed block 10, the arms 32 close off the curved space, in whole or in part, to grip and hold a cable in the space.

The movable block 30 further comprises two opposing posts 34 extending out from each side of the movable block 30. The posts 34 are adapted to fit within the corresponding slots 14 in the side of the fixed block 30. Each slot 14 has a plurality of pairs of indentations 16a-d. The posts 34 each have a pair of protrusions 36 that engage with an indentation pair so as to fix the movable block 30 at a certain point, thus providing a curved space of a fixed size.

Figure 3:
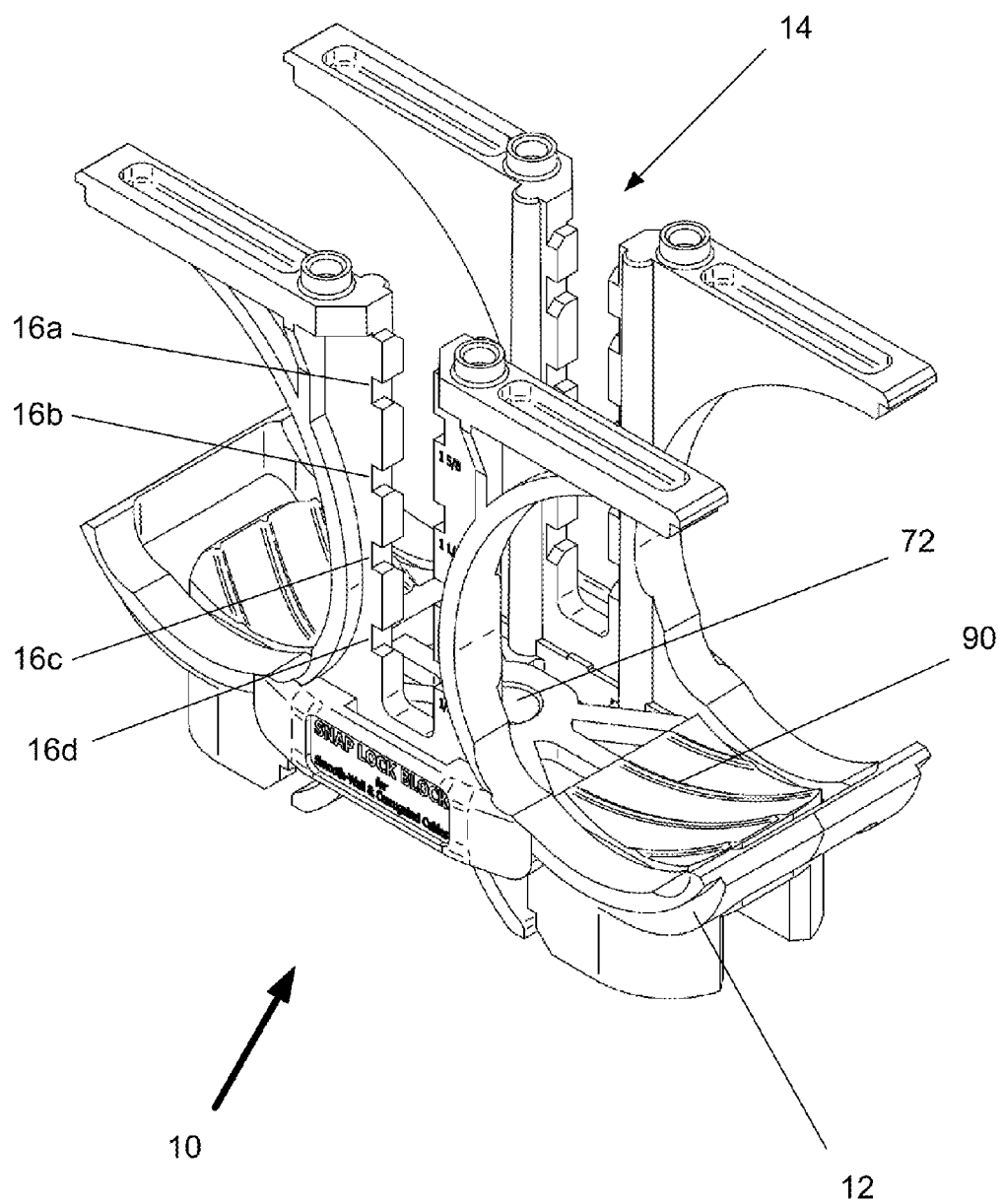
FIG. 3 is a perspective view of a fixed block in accordance with an exemplary embodiment of the present invention.
Figure 4:
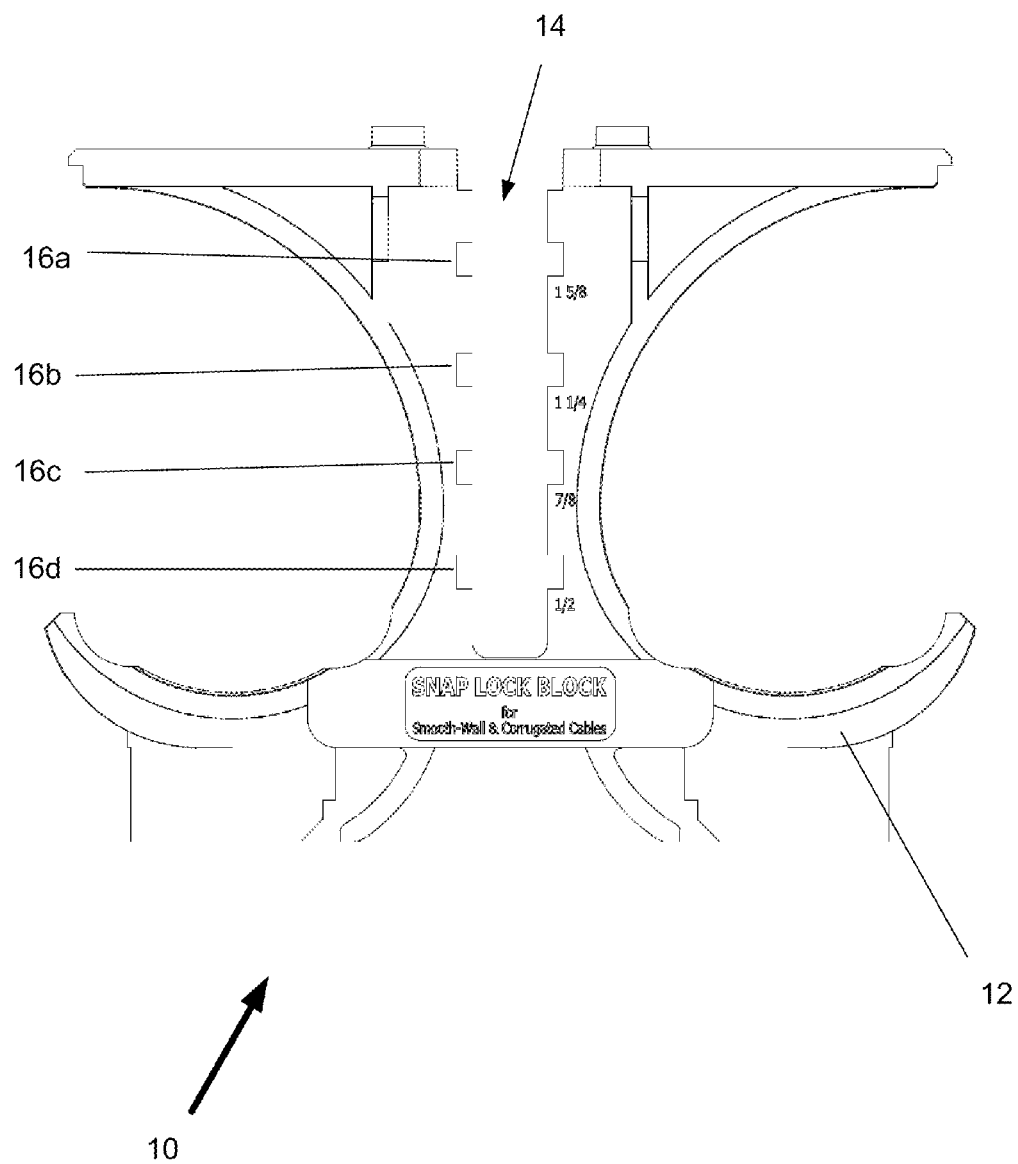
FIG. 4 is a side view of the fixed block of FIG. 3.
Figure 5:
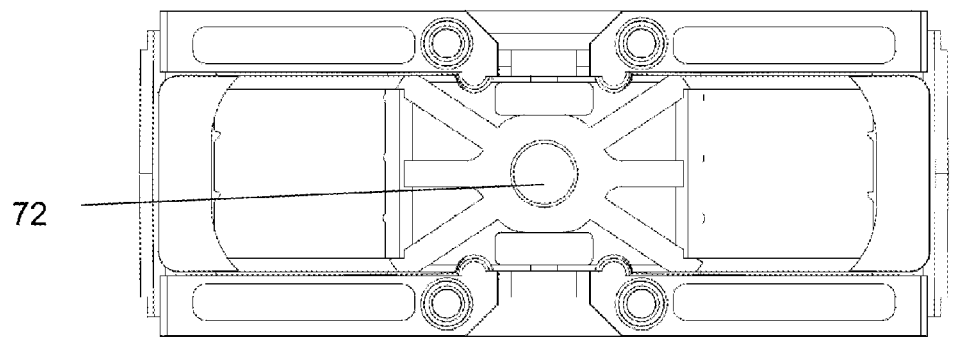
FIG. 5 is a top view of the fixed block of FIG. 3.
Figure 6:
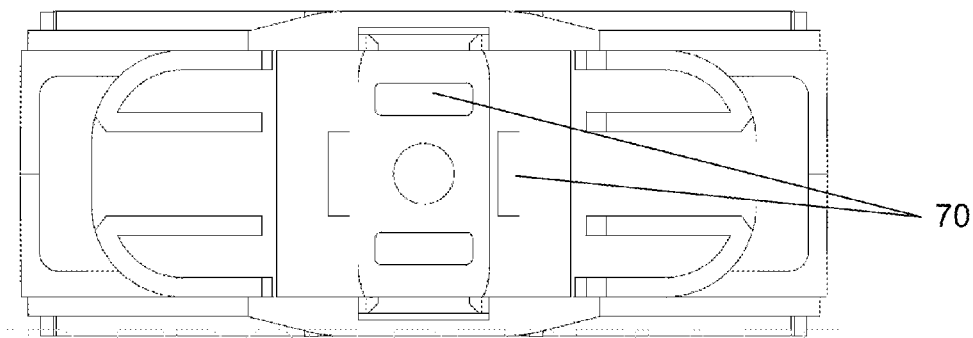
FIG. 6 is a bottom view of the fixed block of FIG. 3.
Figure 7:
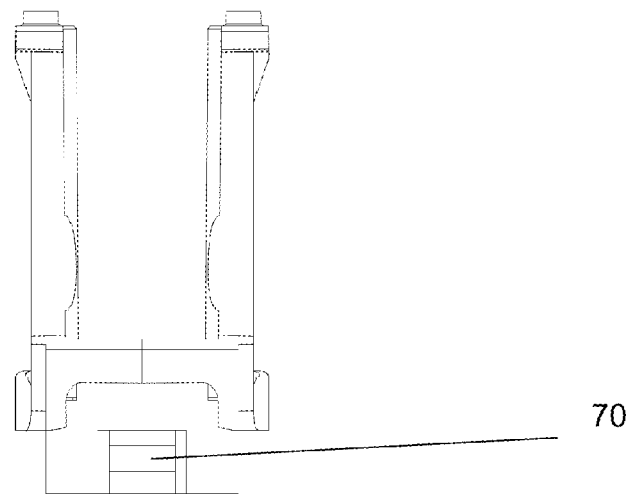
FIG. 7 is an end view of the fixed block of FIG. 3.
Figure 8:
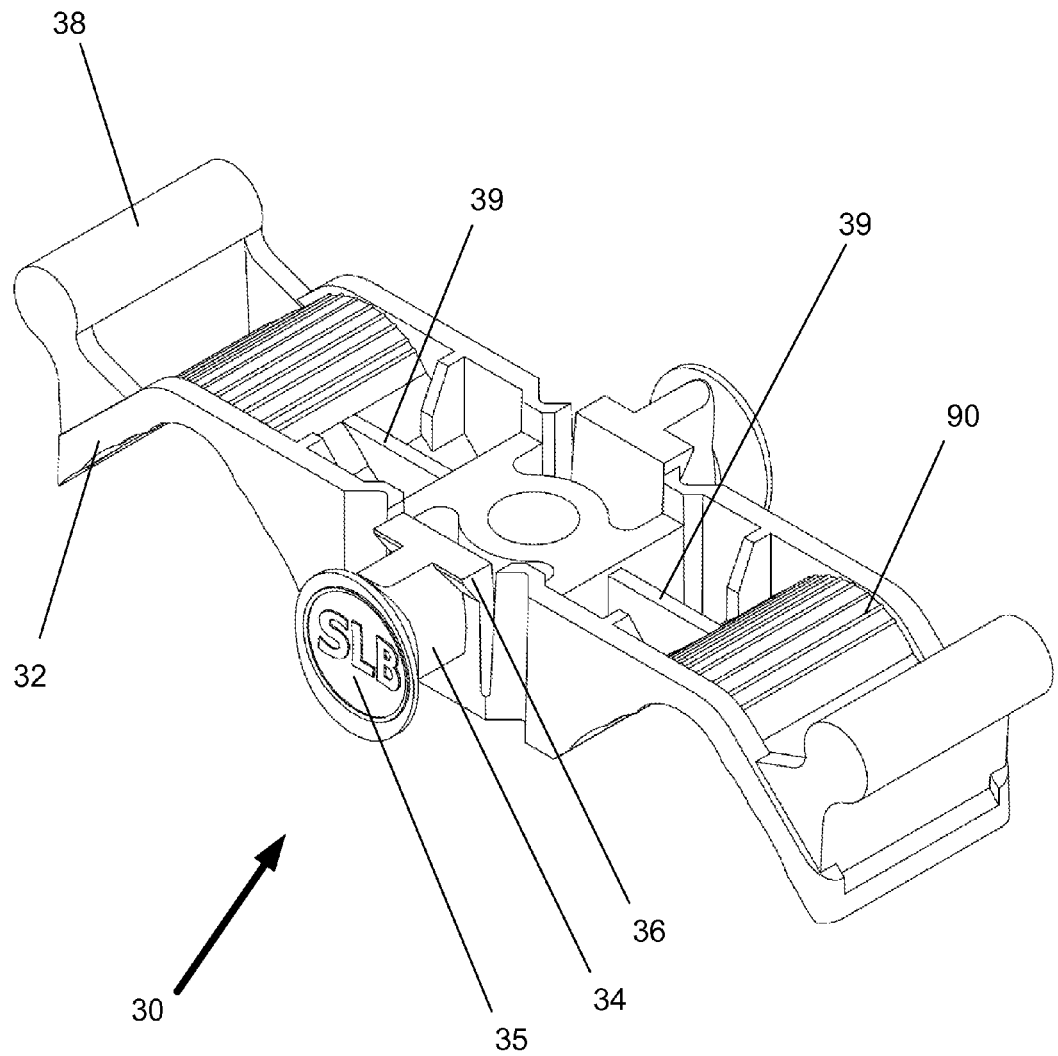
FIG. 8 is a perspective view of a movable block in accordance with an exemplary embodiment of the present invention.
Figure 9:
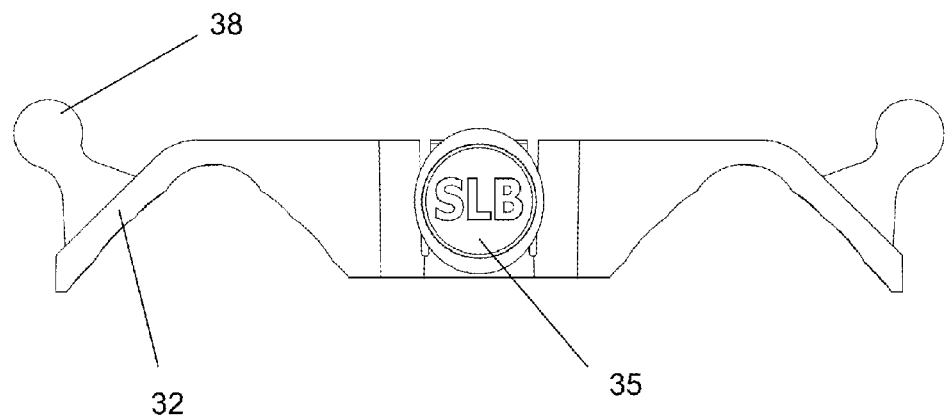
FIG. 9 is a side view of the movable block of FIG. 8.
Figure 10:
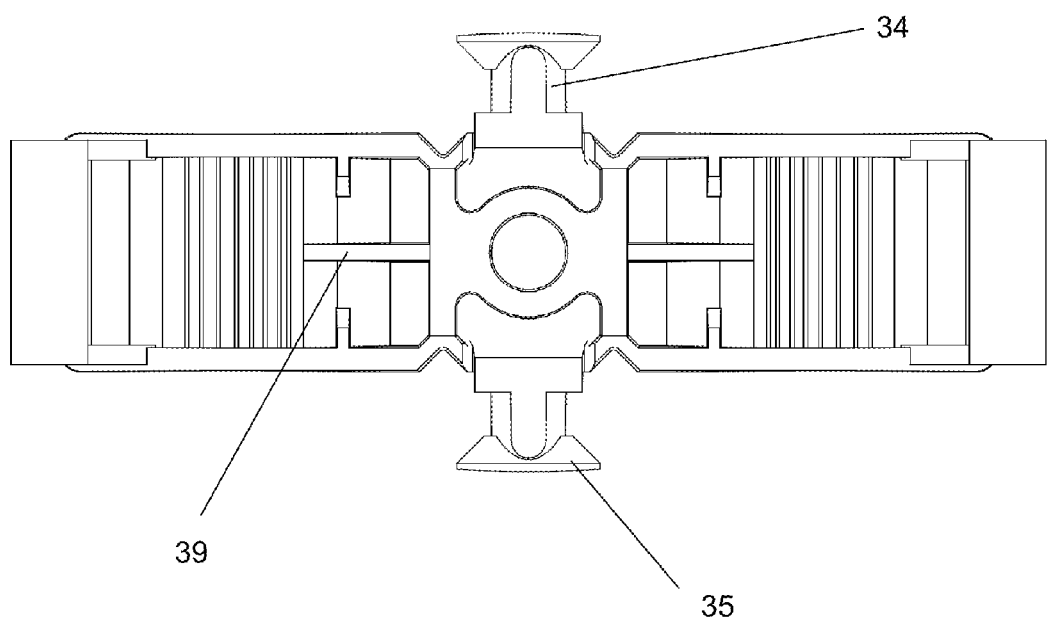
FIG. 10 is a top view of the movable block of FIG. 8.
Figure 11:
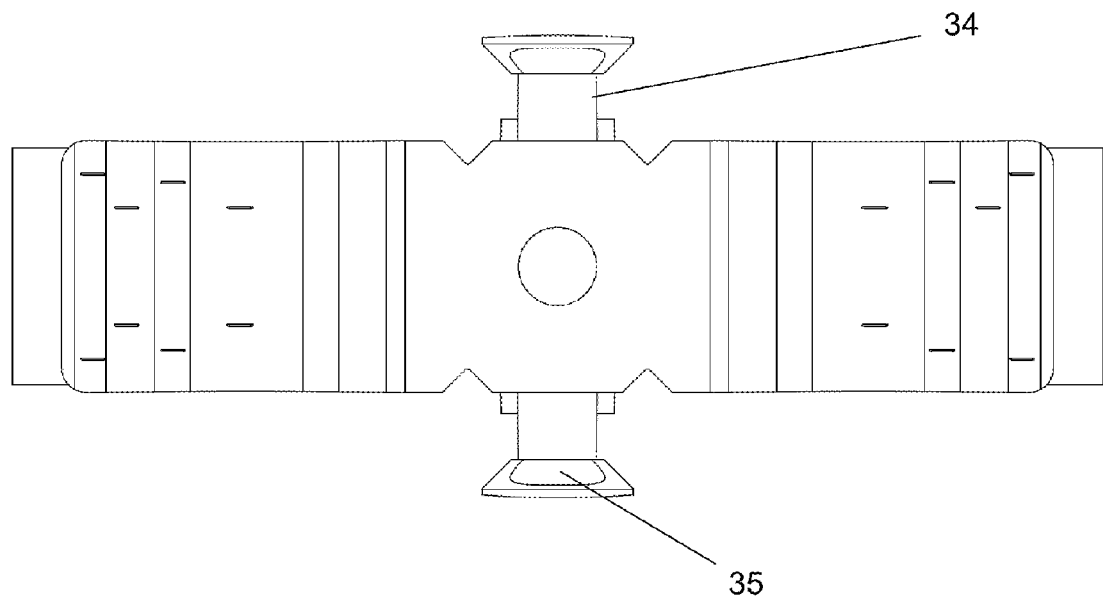
FIG. 11 is a bottom view of the movable block of FIG. 8.
Figure 12:
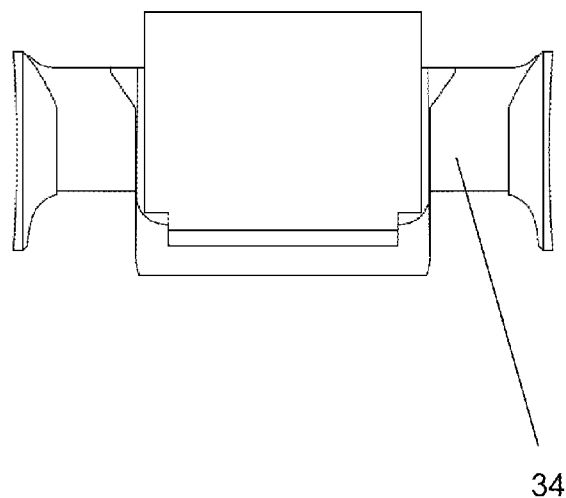
FIG. 12 is an end view of the movable block of FIG. 8.
Figure 13:
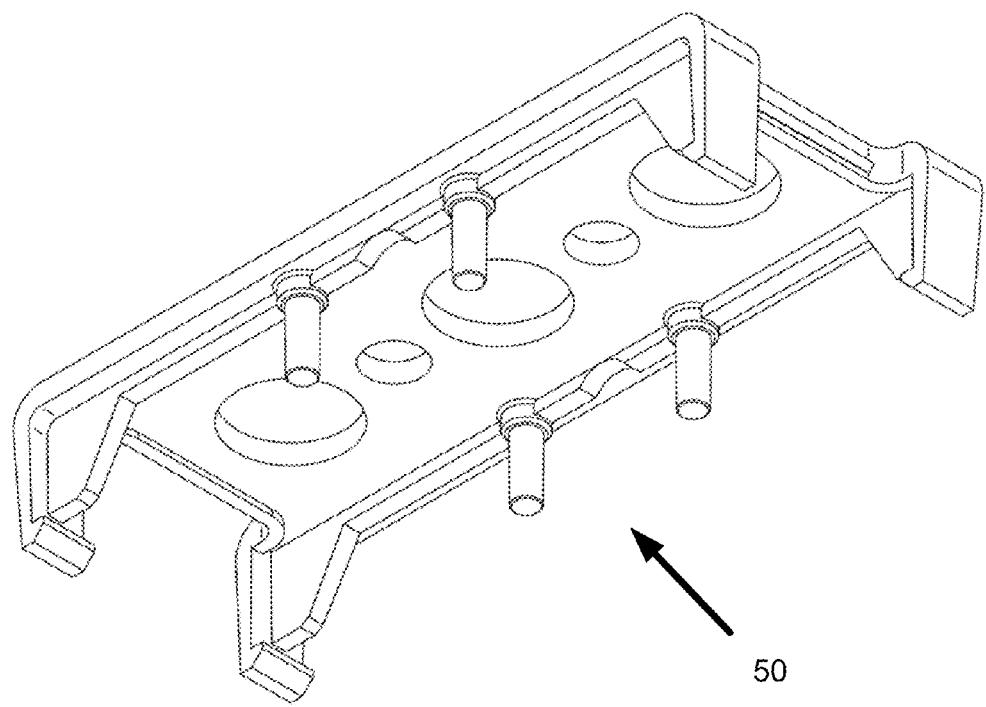
FIG. 13 is a perspective view of a cap in accordance with an exemplary embodiment of the present invention.
Figure 14:
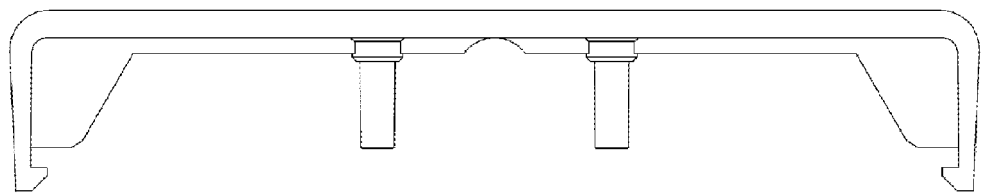
FIG. 14 is a side view of the cap of FIG. 13.
Figure 15:
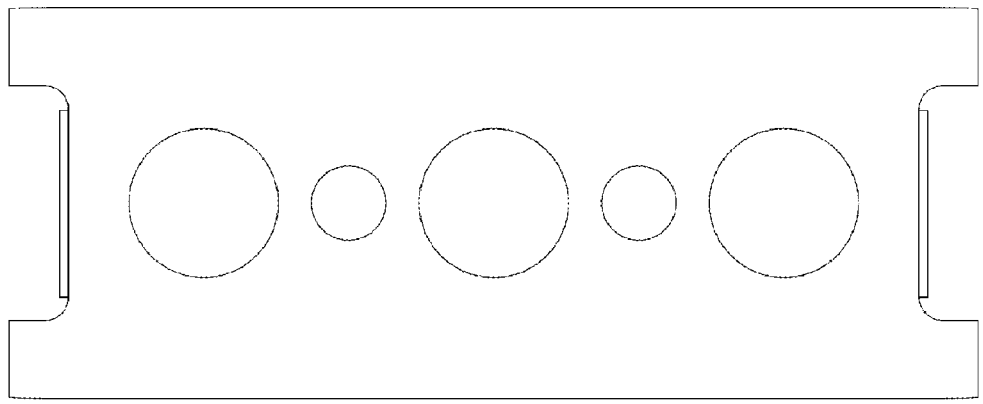
FIG. 15 is a top view of the cap of FIG. 13.
Figure 16:
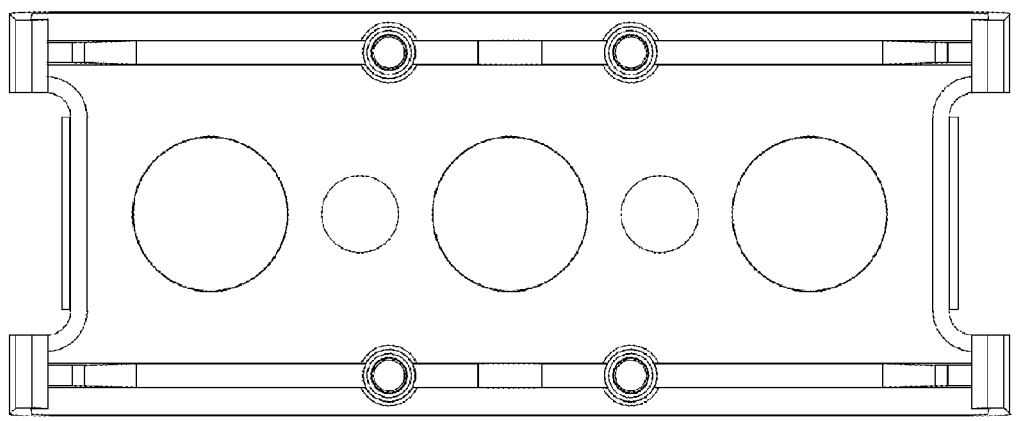
FIG. 16 is a bottom view of the cap of FIG. 13.
Figure 17:
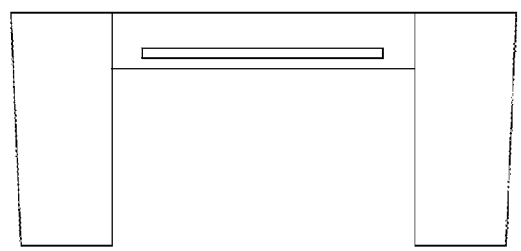
FIG. 17 is an end view of the cap of FIG. 13.
Figure 18:
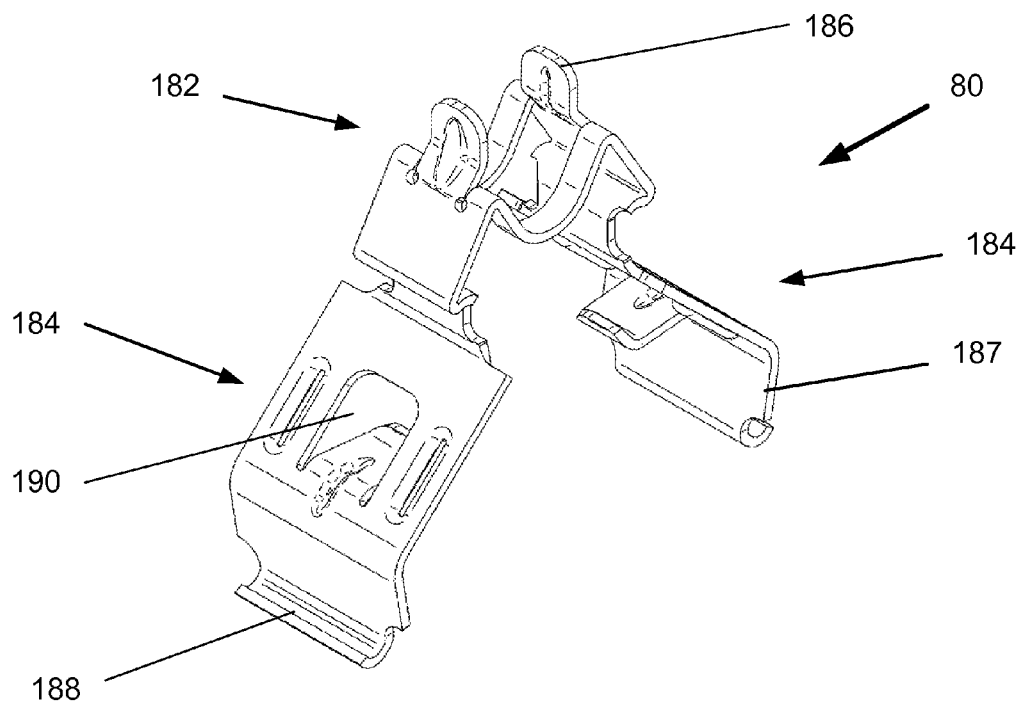
FIG. 18 is a perspective view of a plunger in accordance with an exemplary embodiment of the present invention.
Figure 19:
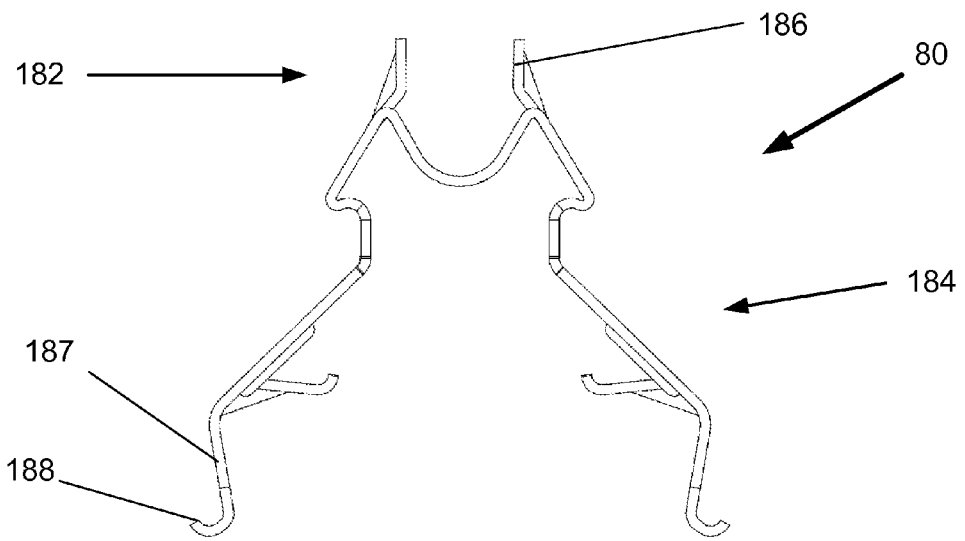
FIG. 19 is a side view of the plunger of FIG. 18.
Figure 20:
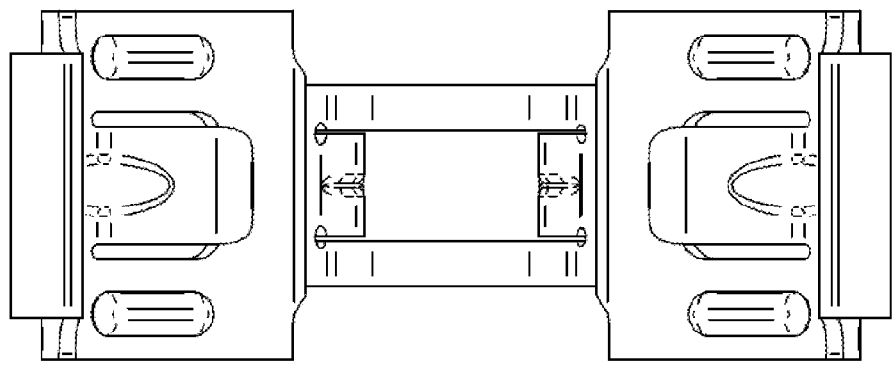
FIG. 20 is a top view of the plunger of FIG. 18.
Figure 21:
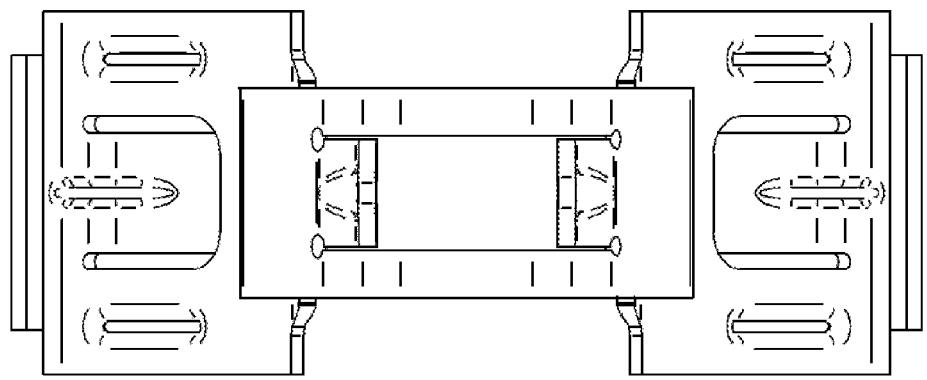
FIG. 21 is a bottom view of the plunger of FIG. 18.
Figure 22:
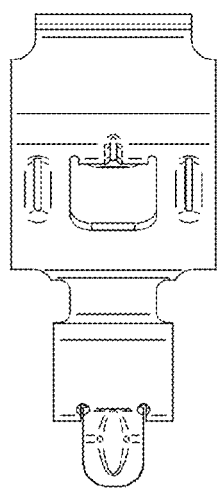
FIG. 22 is an end view of the plunger of FIG. 18.
Figure 23:
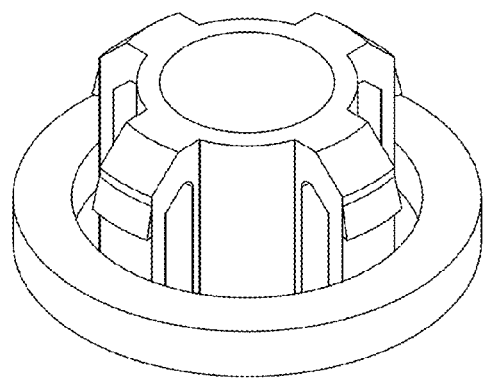
FIG. 23 is a perspective view of a plug in accordance with an exemplary embodiment of the present invention.
Figure 24:
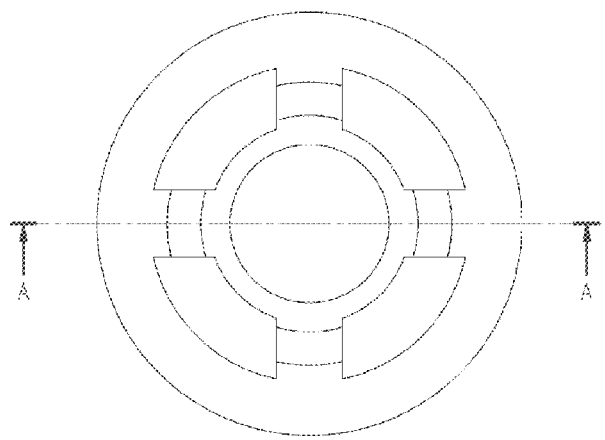
FIG. 24 is a bottom view of the plug of FIG. 23.
Figure 25:
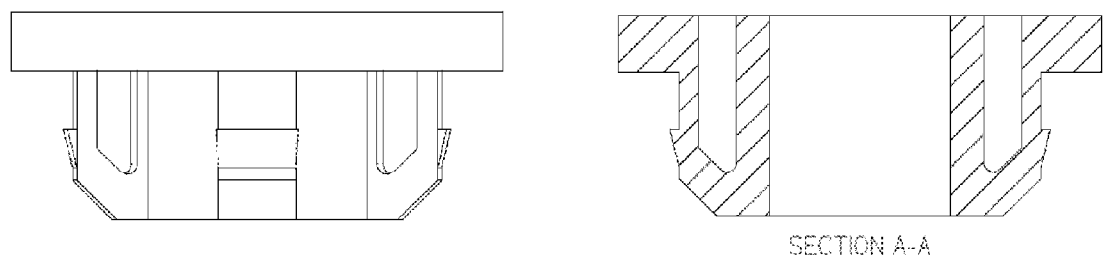
FIG. 25 is a side view of the plug of FIG. 23.
Figure 26:
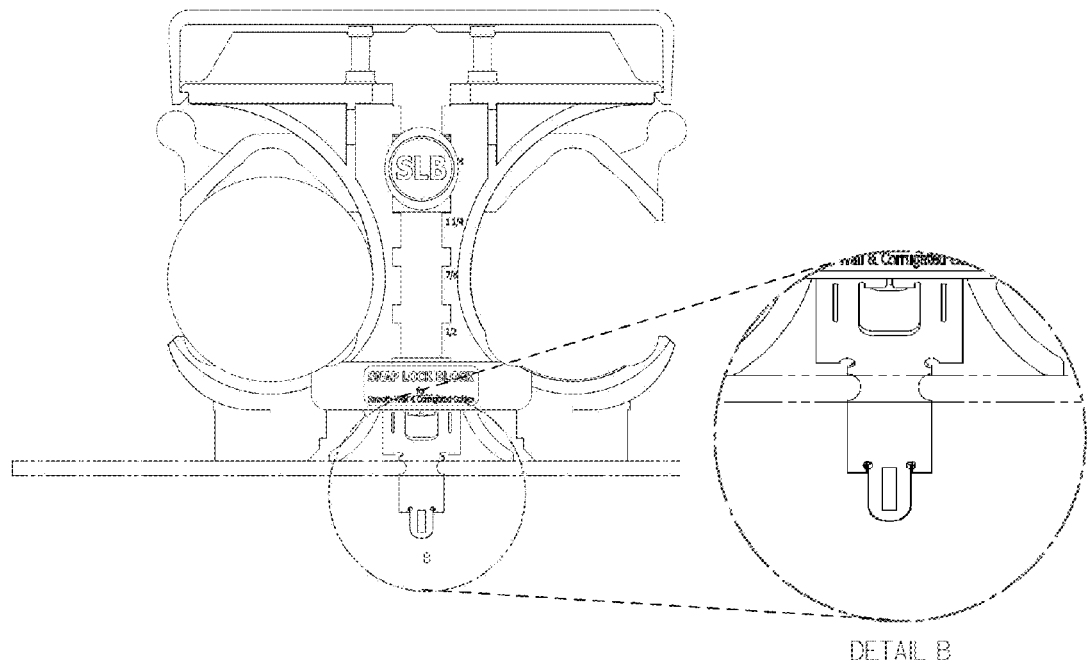
FIG. 26 is a side view of the hanger of FIG. 1 fastened to a plate.
Figure 27:
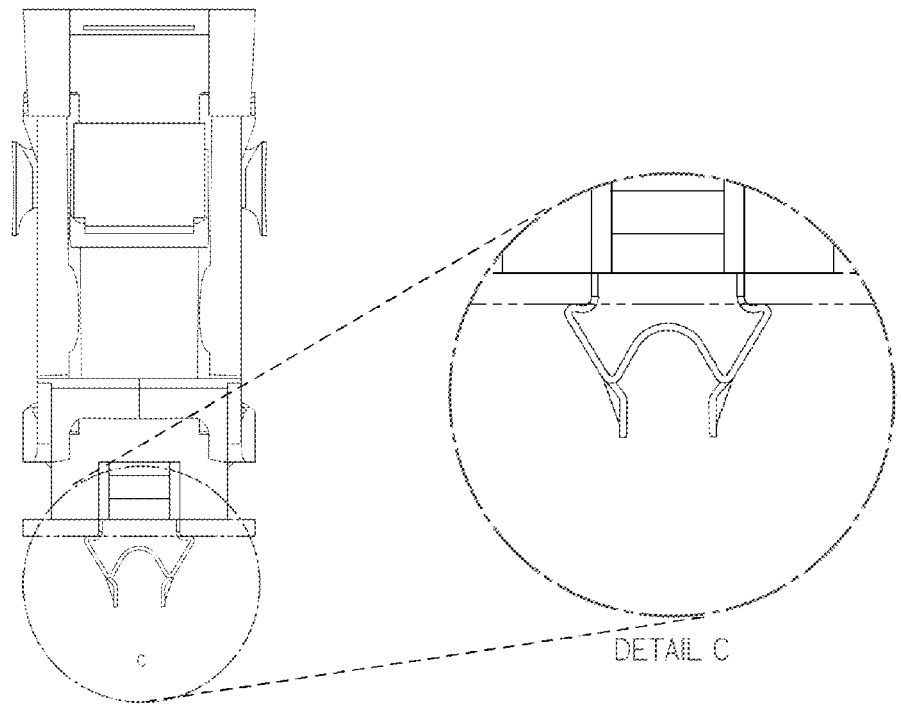
FIG. 27 is an end view of FIG. 26.
Figure 28:
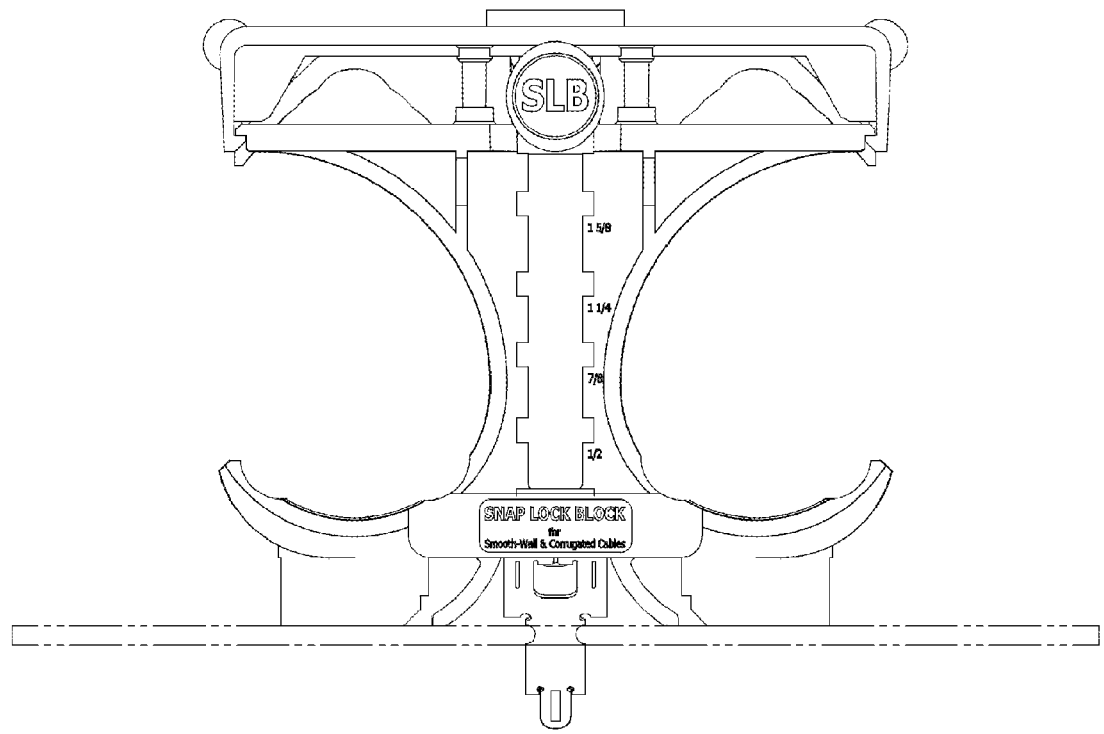
FIG. 28 is a side view of a hanger where the movable block is in the zero position, in accordance with an exemplary embodiment of the present invention.
Figure 29:
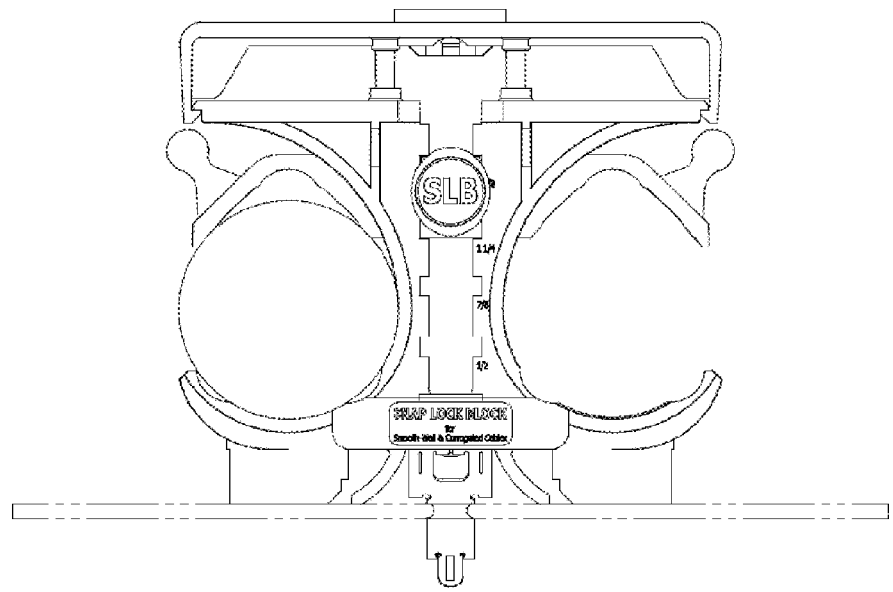
FIG. 29 is a side view of hanger where the movable block has been engaged in the first position, suitable for a cable size of 1⅝ inch in this exemplary embodiment.
Figure 30:
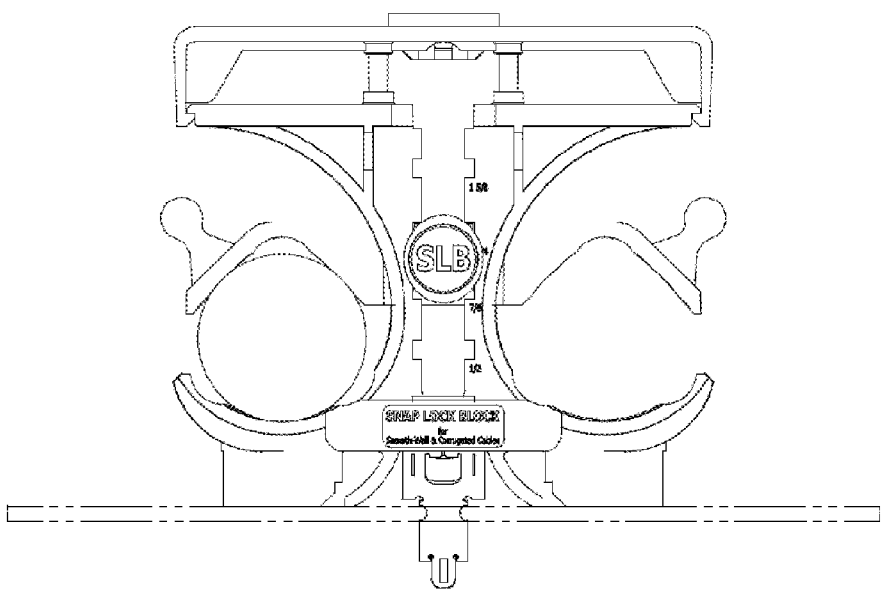
FIG. 30 is a side view of hanger where the movable block has been engaged in the second position, suitable for a cable size of 1¼ inch in this exemplary embodiment.
Figure 31:
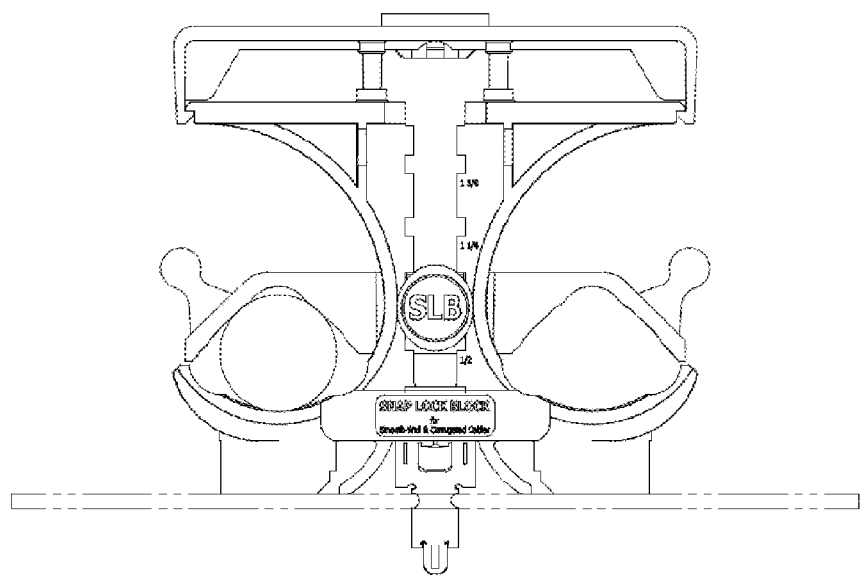
FIG. 31 is a side view of hanger where the movable block has been engaged in the third position, suitable for a cable size of ⅞ inch in this exemplary embodiment.
Figure 32:
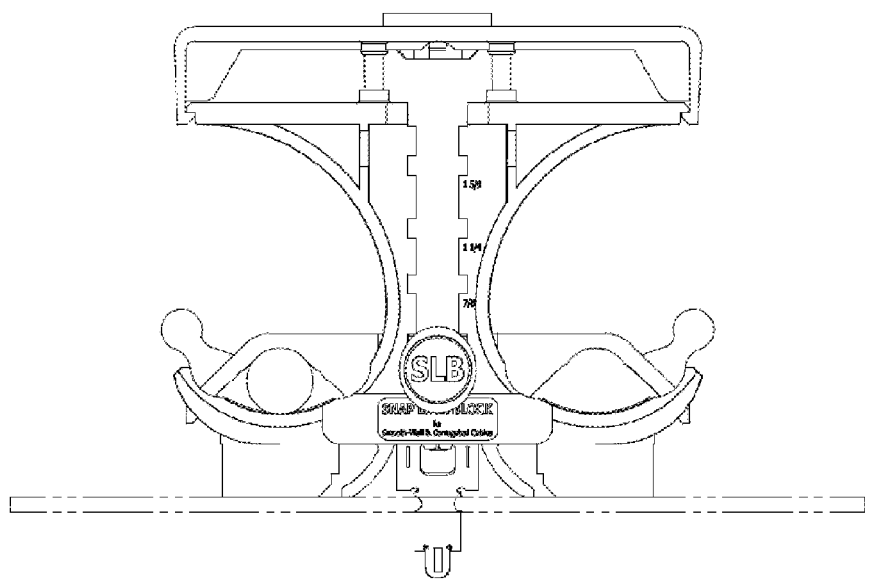
FIG. 32 is a side view of hanger where the movable block has been engaged in the fourth position, suitable for a cable size of ½ inch in this exemplary embodiment.
Figure 33:
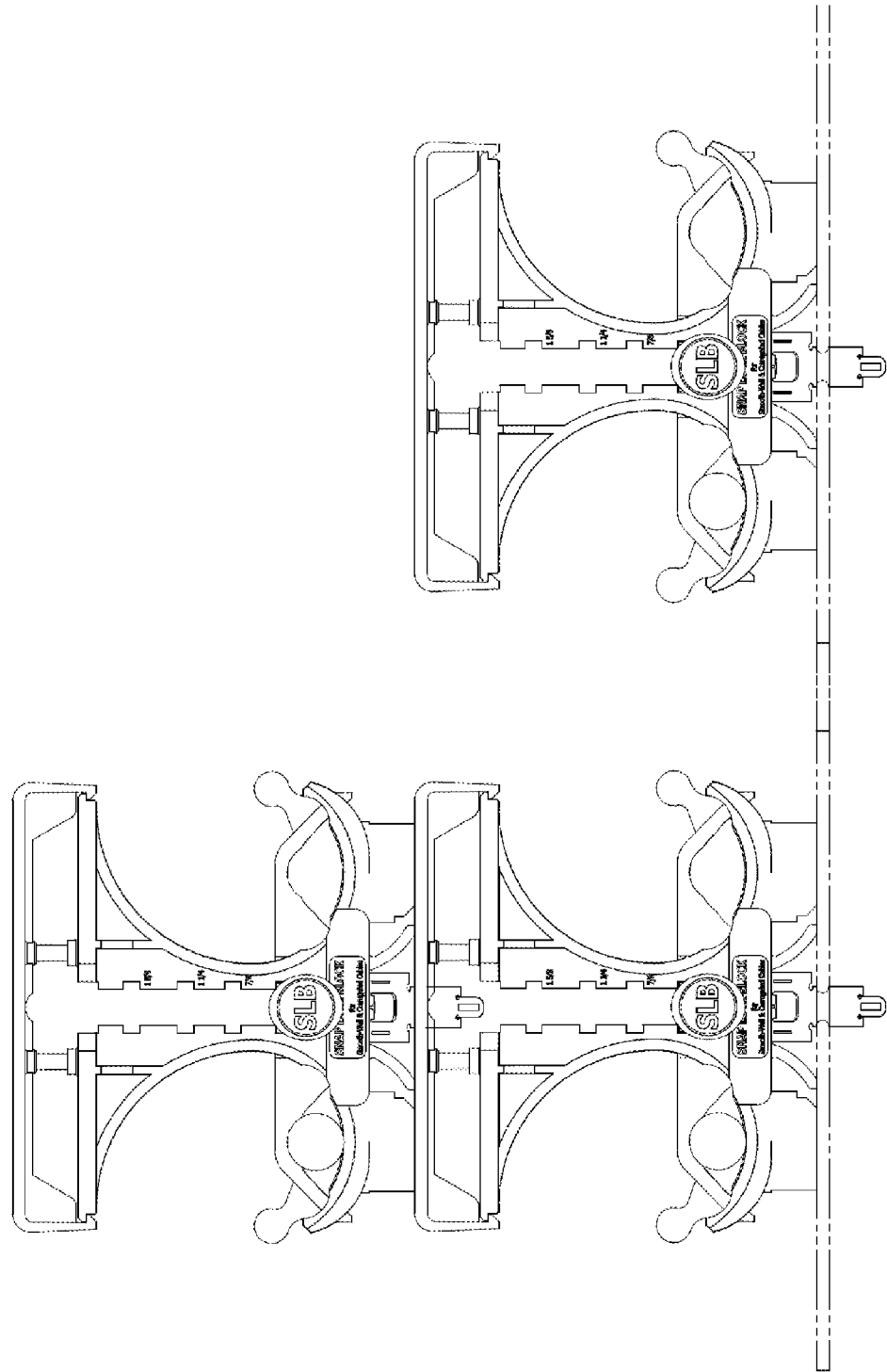
FIG. 33 is a side view of single and double stack of hangers in accordance with an exemplary embodiment of the present invention.
Figure 34:
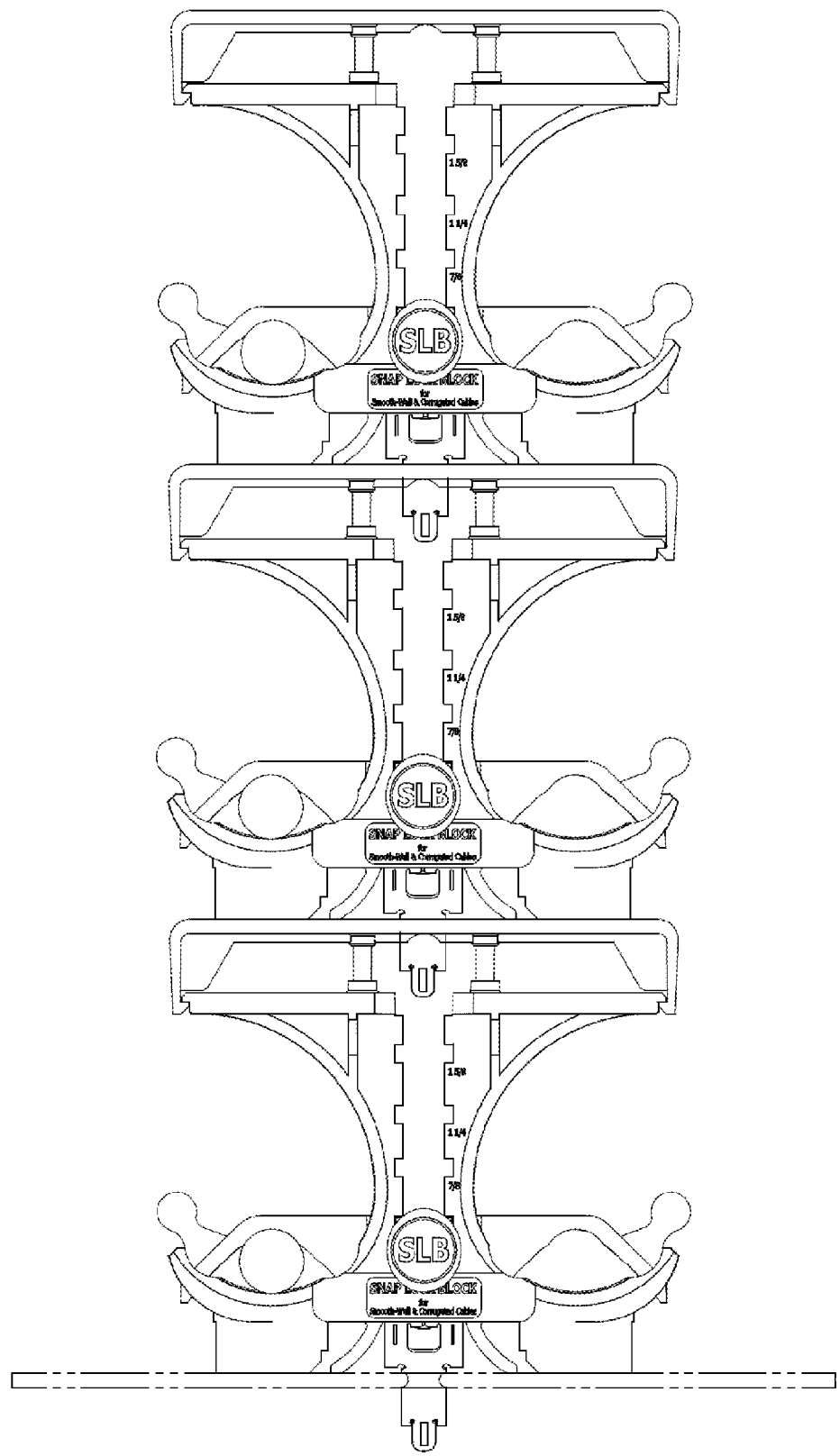
FIG. 34 is a side view of a triple stack of hangers in accordance with an exemplary embodiment of the present invention.
Figure 35:
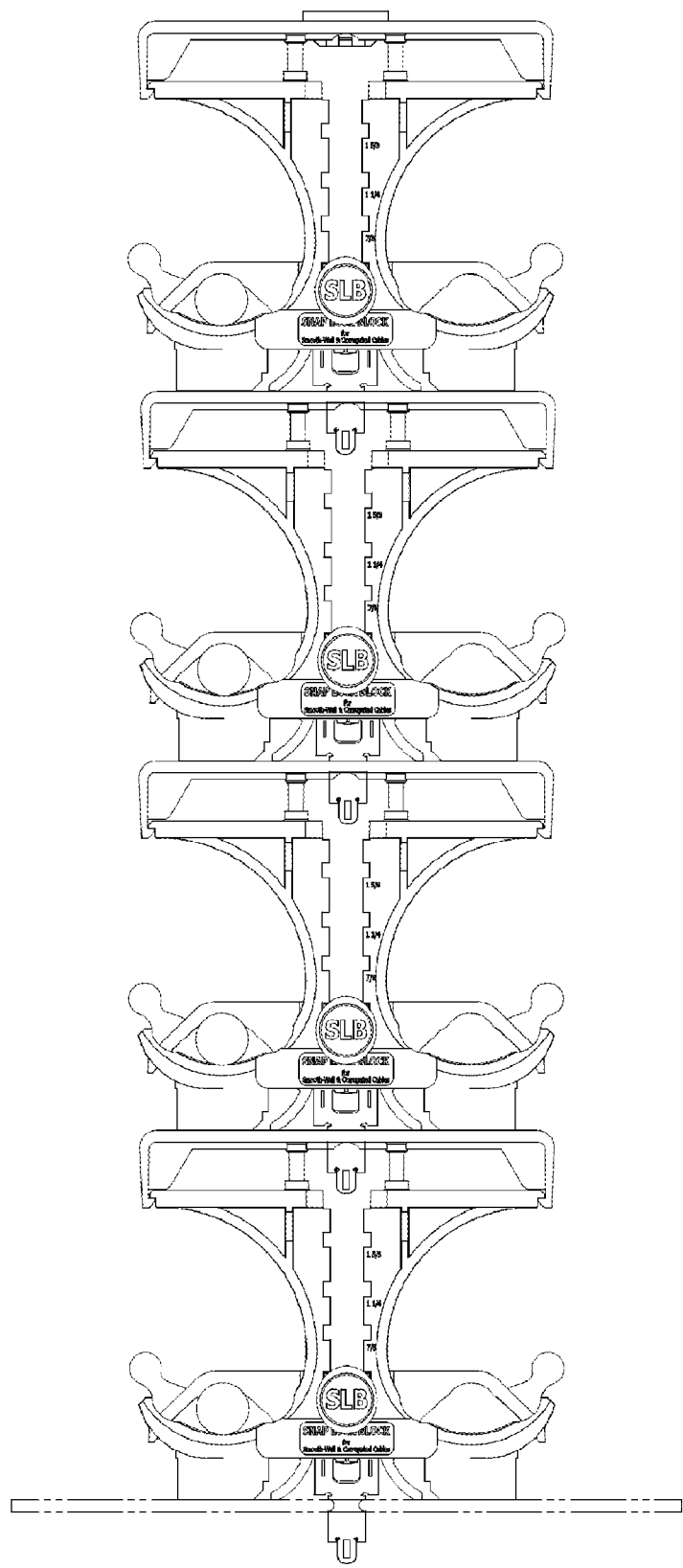
FIG. 35 is a side view of a quadruple stack of hangers in accordance with an exemplary embodiment of the present invention.

FIGS. 1-3 show an exemplary embodiment with four pairs of indentations, thus resulting in four possible sizes of curved space. In this embodiment, the same clamp can be used to hold four different sizes of cables as needed. With two spaces, each clamp can hold up to two cables. In one exemplary embodiment, the present invention can accommodate eight of the most common corrugated and smooth-wall cable radii used within the industry.

The movable block further comprises a thumb grip 38 on one or both arms 32. The thumb grips 38 are designed to enable a technician to more easily move the movable block 30 down into the proper position to grip the cables to be held. Similarly, the posts 34 may be capped by a larger diameter post end 35 to enable a technician to more easily push the posts 34 inward, thereby disengaging the movable block from the fixed block and allowing the movable block to be moved outward and cables to be removed. One or more support ribs 39 may be used to strengthen the block.

In another embodiment, the present invention further comprises a cap 50 that fits over the movable block 30 and is affixed (removably or permanently) to the top of fixed block 10. The cap 50 prevents the movable block 30 from being lost or becoming completely detached from the fixed block 10, which can cause problems when a technician is suspended on the side of a tower hundreds of feet in the air.

Figure 36:
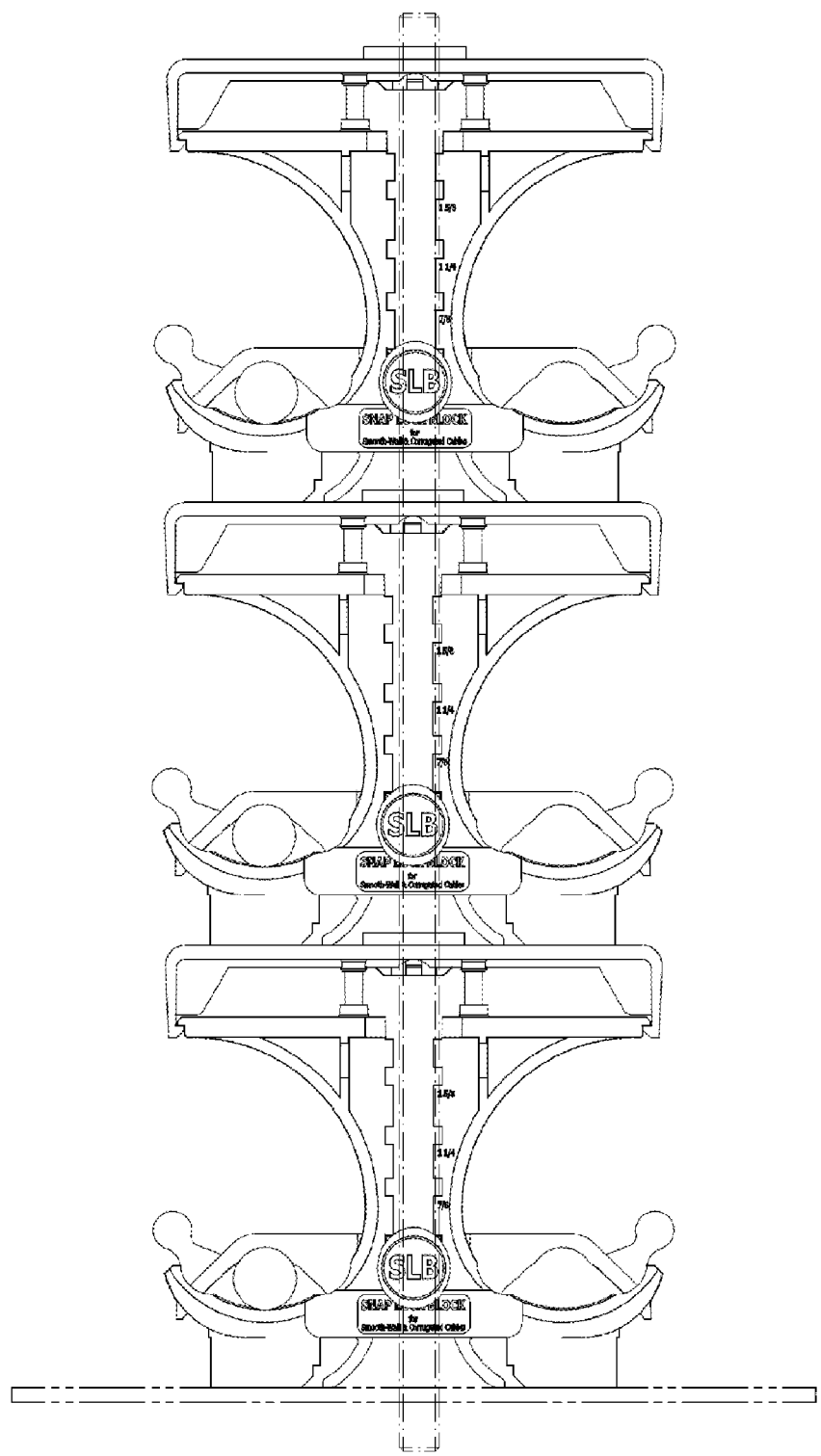
FIG. 36 is a side view of a triple stack of hangers in an alternative configuration using a center rod.
Figure 37:
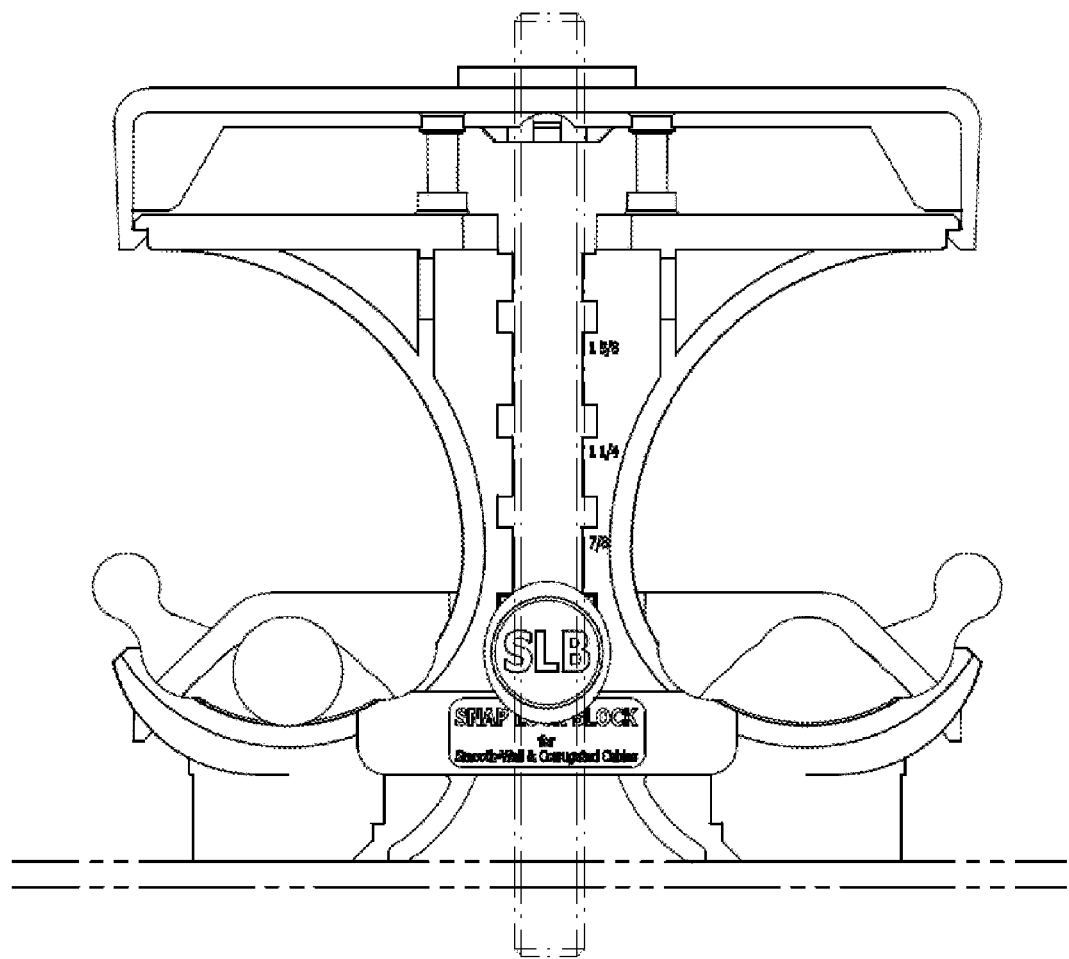
FIG. 37 is a side view of a hanger using a center rod to connect to a plate.
Figure 38:
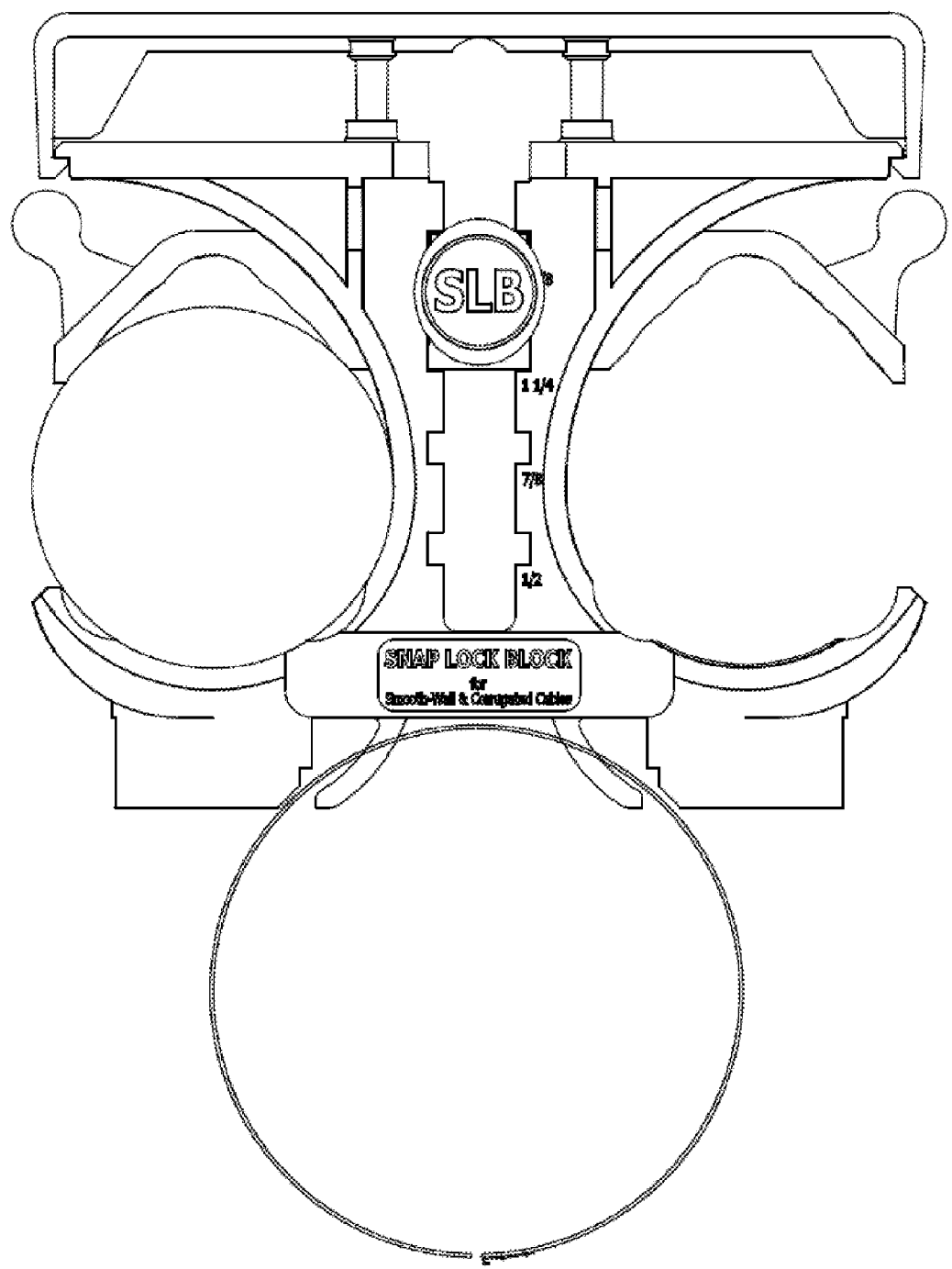
FIG. 38 is a side view of a hanger using a connection strap.
Figure 39:
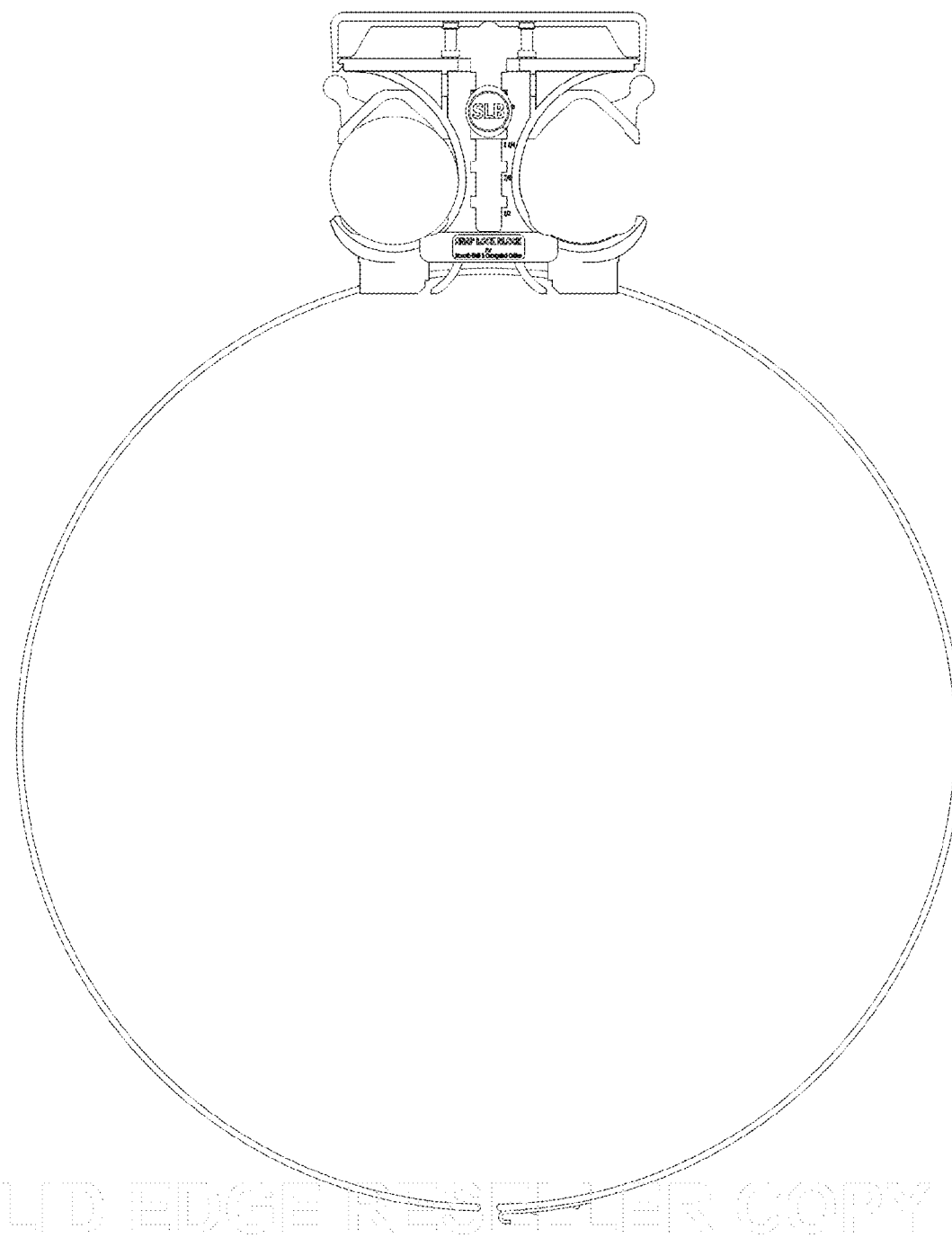
FIG. 39 is a side view of a hanger using a alternative form of connection strap.
Figure 40:
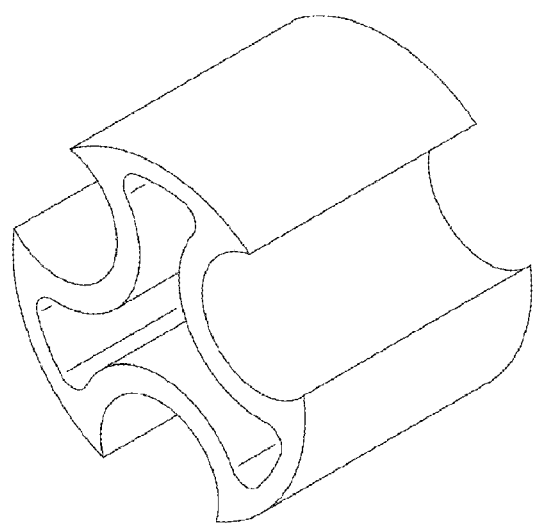
FIG. 40 is a perspective view of a stack insert.
Figure 41:
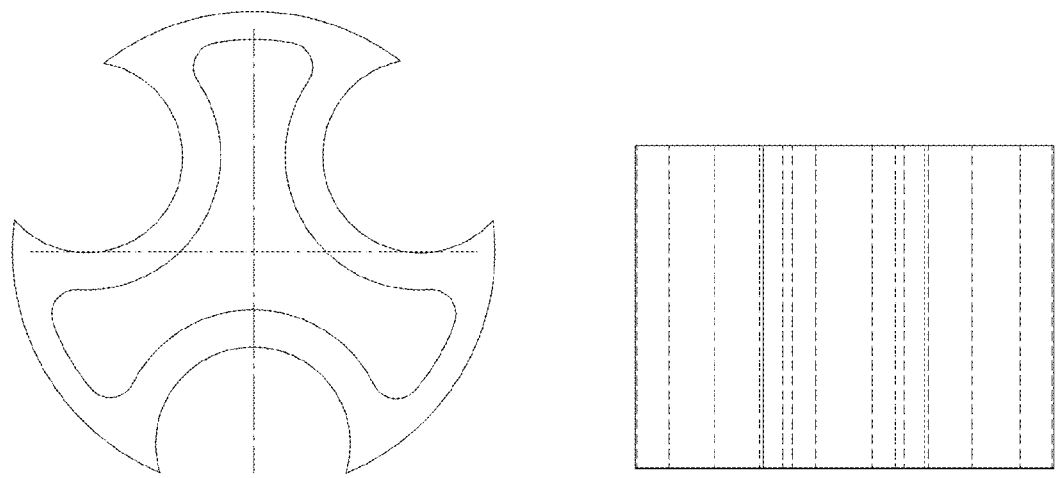
FIG. 41 is a top and side view of a stack insert.

The fixed block 10 may be fastened to the structural element in a variety of ways, so as to be able to be used with a variety of tower designs and materials. Holes and slots 70 in the fixed block can be used with hose clamps or banding strips, as shown in FIGS. 38 and 39. A center hole 72 allows the present invention to be used with a threaded rod, as shown in FIGS. 36 and 37. Alternatively, a plunger 80, as shown in FIGS. 26 to 34, may engage corresponding slots in the bottom of the block. The embodiment of the plunger 80 shown in detail in FIGS. 18 through 22 is a new and unique plunger design, and is adapted to work in a variety of ways, as shown in FIGS. 26 to 34. In the embodiment shown in FIGS. 18 to 22, the plunger 80 comprises a triangular-shaped structure with an apex 182 and two legs 184 forming two sides of the triangle, the apex comprising one or more protrusions or lips 186 to be inserted into and engage a hole in a supporting structure or a transmission hanger. The legs 184 may comprise inward-bending feet 187, with curved ends 188 that are adapted to engage slots or holes in a supporting structure or a transmission hanger. The curved ends 188 may curve outward. The legs 184 also may have one or more holes or slots 190 in the legs.

Grooves or ridges 90 may be used on all or a portion of the gripping surface of the fixed block and/or movable block. While such grooves or ridges are known in the prior art, their horizontal alignment in prior art devices can lead to slippage problems due to slight variations in the outer diameter of the cable or line to be secured. Accordingly, in one embodiment, the grooves or ridges 90 on the movable block are fashioned in a diagonal or helical pattern, or some pattern incorporating grooves or ridges at a angle, as shown in FIGS. 1 and 2, in order to securely grip such cables. Such grooves or ridges may be used on other gripping surfaces as well.

As shown in FIGS. 33 to 36, the hanger of the present invention can be stacked vertically. The means for stacking can vary depending on the attachment means. A plunger 80 can be used with each hanger, with the plunger being inserted into a matching hole 92 in the cap of the adjoining hanger. Alternatively, a threaded rod of suitable length can be used, extended through the corresponding holes in the center of the components of each hanger placed on the rod. A plug 94 may be used to close off the center hole in the cap of the outermost hanger (or a single hanger, if only one is used). The plug 94 may also serve as a reducer, with the center hole of the plug adapted to take other sized rods and clamps. Due to the length of the base of the movable block and the cap and other design elements, the stacked hanger structure is more secure and structurally sound than hanger stacks known in the prior art, resulting in less twisting and warping of the hanger structures when installed. Stability also is enhanced due to the number of support points.

In one exemplary embodiment, the cable aperture is designed for ease of insertion of the cable during installation, and its curved design helps keep the cable in place when inserted. The thumb grips assist in pushing the movable block to engage the cable(s) after insertion so as to secure the cable(s). With the plunger, the hanger can be self-inserting, also making installation easier.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

What is claimed is:

1. A hanger for attaching one or more transmission lines to a structure, comprising:
   a first block with a front and a back and a right side and a left side and a top and a bottom, comprising a front pair of curved sections and a back pair of curved sections, each of said sections having a vertical slot, each of said slots comprising a right side and a left side, with one or more pairs of indentations in the right and left sides of each of said slots; and
   a movable block with a front and a back and a right side and a left side, comprising a second pair of curved sections corresponding to and fitting between the front pair and back pair of curved sections of the first block,
   said movable block further comprising a front post and a back post extending from the front and the back sides of the movable block between the second pair of curved sections, each of said posts adapted to fit into one of said slots in the first block, each of said posts further comprising a pair of protrusions to engage one of said pairs of indentations in one of said slots.

2. The hanger of claim 1, wherein the movable block is connected to the first block to form a pair of curved clamping spaces of fixed size when each of said pairs of protrusions are engaged with one of said pairs of indentations in one of said slots.

3. The hanger of claim 2, wherein each of said slots has four pairs of indentations, so that the movable block can be connected to the first block to form the clamping spaces of up to four fixed sizes.

4. The hanger of claim 1, further comprising a gripping structure at the right side and left side of the movable block.

5. The hanger of claim 1, further wherein said front post and said back post may be pushed inward to disengage said pair of protrusions on each of said front post and back post from each of said pair of indentations, thereby allowing the movable block to be moved relative to the first block.

6. The hanger of claim 1, further comprising a cap piece affixed to the top of said first block.

7. The hanger of claim 6, wherein the cap piece comprises a center hole.

8. The hanger of claim 7, whereby a first hanger and a second hanger can be stacked.

9. The hanger of claim 8, wherein said first hanger and said second hanger are attached by a plunger, said plunger engaging openings or holes in the bottom of the first block of said first hanger, and further engaging the center hole of the cap piece to said second hanger.

10. The hanger of claim 8, wherein said first hanger and said second hanger are attached by a rod extending through a hole in the bottom of said first hanger and further through the center hole in the cap piece of said second hanger.

11. The hanger of claim 1, wherein the first block further comprises a plurality of holes or openings for fastening the first block to the structure with hose clamps or banding strips.

12. The hanger of claim 11, further comprising a plunger, said plunger adapted to engage at least one of said openings or holes in the first block.

13. The hanger of claim 1, further comprising a hole in the bottom of the first block for fastening the first block to the structure with a rod or bolt.

14. The hanger of claim 1, wherein the front and back pairs of curved sections of the first block or the second pair of curved sections of the movable block, or both, comprise ridges or grooves.

15. The hanger of claim 14, wherein the ridges or grooves are angled.

16. The hanger of claim 15, wherein the ridges or grooves are patterned.

17. The hanger of claim 15, wherein the ridges or grooves form part of a helix.

18. The hanger of claim 1, wherein the front and back pair of curved sections of the first block are curved so as to keep the transmission line cable in place when being secured.

19. A connection device for a transmission hanger for holding transmission cables, comprising: a plunger with an apex and two legs forming two sides of a triangle, the apex with one or more protrusions or lips to be inserted into and engage a hole in a first supporting structure or first transmission hanger, and the legs comprising one or more holes or slots in each of said legs, each of said legs further curving inward to form a foot, said foot comprising a outwardly curving end adapted to engage slots or holes in a second supporting structure or second transmission hanger.

\* \* \* \* \*